July 8, 1924.
A. F. PRESTON
CUTTING MECHANISM
Original Filed May 18, 1916
1,500,638
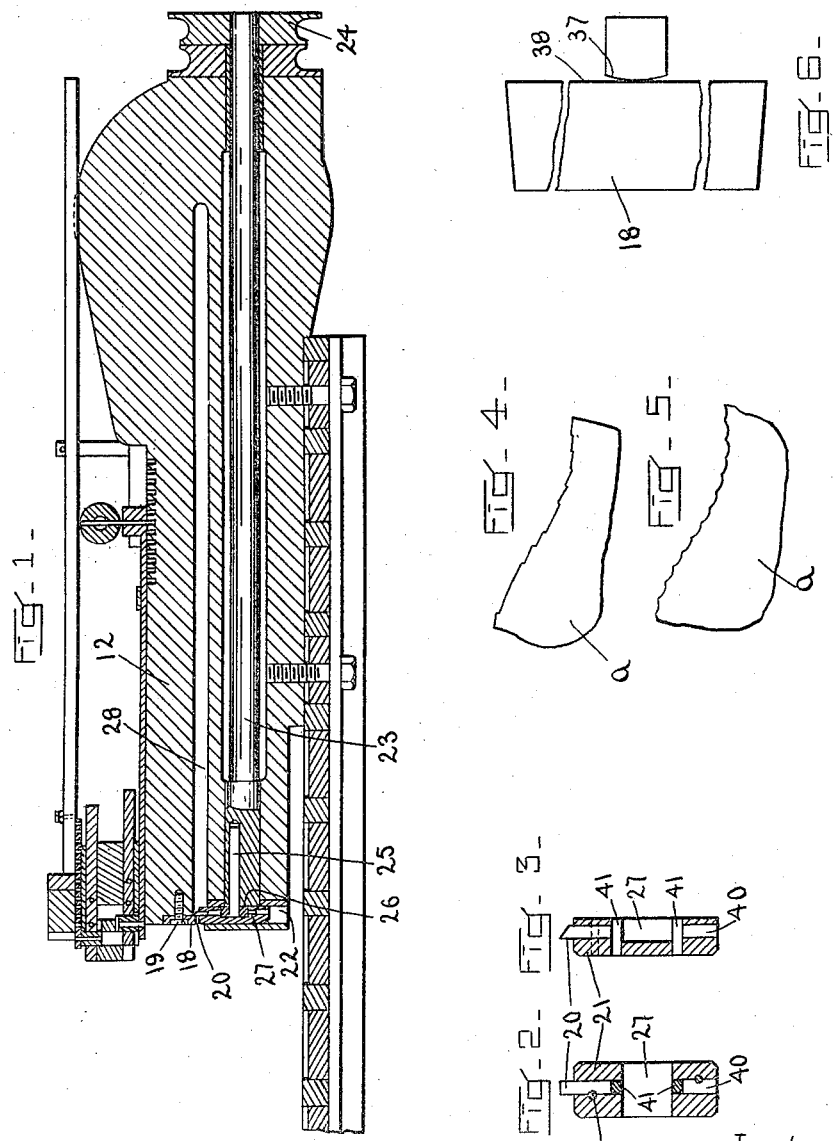

Patented July 8, 1924.

1,500,638

UNITED STATES PATENT OFFICE.

ALBERT F. PRESTON, DECEASED, LATE OF BOSTON, MASSACHUSETTS; BY JOHN ABBOTT, OF WINCHESTER, AND ALFRED BENSON WHITE, OF BROOKLINE, MASSACHUSETTS, ADMINISTRATORS.

CUTTING MECHANISM.

Original application filed May 18, 1916, Serial No. 98,342. Patent No. 1,383,023, dated June 28, 1921. Divided and this application filed April 21, 1921. Serial No. 463,292.

*To all whom it may concern:*

Be it known that ALBERT F. PRESTON, deceased, late a citizen of the United States, residing at Boston, in the county of Suffolk and State of Massachusetts, invented new and useful Improvements in Cutting Mechanism, of which the following is a specification.

This invention has reference to cutting means embodied in a pair of complemental shearing cutters which are particularly intended for the use, among others, of cutting pieces from sheet material on predetermined outlines. More particularly the subject-matter of the present application is an invention divided from the prior application filed by Albert F. Preston, deceased, which has matured into Patent No. 1,383,023, dated June 28, 1921, and the specific use for which the cutting apparatus is applied in said parent application is for cutting patterns out of sheet stock similar to a model pattern and either of the same size as, or larger or smaller than, the model. In the combination disclosed in the parent application the model and sheet of stock from which the reproduced article is to be cut are mounted in the same holder, with a space between them, and are moved in unison past a guide and the cutting mechanism, respectively, the edge of the model being in contact with the guide and the blank sheet of stock being placed between the complemental cutters so that it will be sheared thereby on lines similar to the outlines of the model.

The purpose of the present application is to protect the invention involved in the new features of the cutting means for any use to which said cutting means may be adapted and independently of its association with the machine described in the parent application.

The invention is embodied in two cutters of which, at least, one of them is reciprocated across the edge of the other, and one of them has a short cutting edge in order to permit of cutting out pieces on curved lines. The other or complemental cutter may have a cutting edge of any length and is preferably adjustable so as to bring different parts of its cutting edge into cooperation with the first cutter as parts of such edge become dull. In its most practical form this adjustable cutter is a disk and is so shown here.

The important new feature of the cutting mechanism is that the cutter which has the short edge is convex toward the other cutter, while the edge of the other cutter is straight, at least the projection of such edge on the plane of the stock which is being cut is straight. A point in the curved edge of the one cutter comes approximately tangent to the edge of the complemental cutter, while other parts of such curved edge diverge from the projection of the complemental cutter. Thereby it becomes possible, in turning a sheet of stock so as to cut out a curved outline, and particularly such outline as defines a concavity in the edge of the article being produced, to enable the tangent point of the curved cutting edge to follow the required outline accurately and without permitting parts of said edge at either side of this tangent point to cut beyond the required line into the body of the article being produced.

In the drawings,—

Figure 1 is an illustration of one use of the invention, showing in longitudinal section the cutter head of a machine in which my improved cutters are used.

Figures 2 and 3 are detail sectional views of the cutter holder and cutter illustrating a novel mode of mounting the cutter in the holder.

Figures 4 and 5 are diagrams showing fragments of articles outlined by cutting tools, and illustrating by contrast the new and improved result accomplished by the present improved cutting device.

Figure 6 is a plan view much enlarged of the complemental cutters which constitute the cutting or shearing device in which my present invention is embodied.

The same reference characters indicate the same parts in all the figures.

The cutter head 12 represents any means adapted to support and operate complemental cutters in such a manner as to define the outline of, and sever an article from, sheet material. One of such cutters is a disk 18 secured by a screw 19 to the head fixedly, but with capability for being turned to present a fresh sharp portion of its edge to the complemental cutter when another portion of such edge becomes blunt. The complemental cutter 20 is mounted in a carrier or block 21 and slides in a guideway 22 on the head, so arranged that the end of the cutter 20, on which is the cutting edge, passes back and forth across the nearest part of the edge of the cutter 18, said cutters 18 and 20 thus constituting a pair of shears. The cutter 20 is reciprocated rapidly by a shaft 23, power driven by a pulley 24 around which a driving belt passes, said shaft having a crank pin 25 carrying an anti-friction roll 26 which travels in a transverse groove 27 in the carrier or block 21.

In the cutter head is a space 28 to admit the sheet material being cut when such sheet material is passed between the cutters 18 and 20.

One of the main improvements embodied in the cutting mechanism consists in the fact that the cutting edge 37 of the cutter 20 is curved, and also in the combination of such curved cutting edge with the straight edge 38 of the complemental cutter 18. In describing the edge of the cutter 18 as straight I have reference to the projection of such edge on the cutting plane, and disregard the circular periphery of the disk, which has no influence whatever on the result accomplished by the cutting device. The essential thing is that the projection of the operative part of the cutting edge of disk 18 on the cutting plane, that is, the plane in which the sheet of stock to be cut is laid, is a straight line 38, and is essentially the same as though the cutter were a bar having a literally straight edge, or polygonal having a periphery made up of short straight lines. The projection of the edge 37 of the cutter 20 on the plane of the stock to be cut (or in other words on the cutting plane) is curved, and is tangent, preferably at its middle point, to the projection on the same plane of the edge of the cutter 18. The cutter 20 is a bar which is curved or rounded, preferably as the segment of a cylinder, on the side next to the plane in which the cutting edge 38 of the cutter 18 lies. The end of the cutter 20 is ground off on a bevel at an acute angle to the rounded side. Incidentally the cutting edge, formed by the intersection of an inclined plane with a curved surface, is highest at the middle part, but except for the fact that this formation makes it somewhat easier for the cutter to penetrate the stock, it is of no consequence to the real invention.

The utility of the invention is graphically shown in Figures 4 and 5 which show respectively, in a somewhat exaggerated way, the character of work performed respectively by the complemental cutters previously used, both having straight edges, and by my improved cutters. In both figures, a represents a fragment of reproduced pattern.

Complemental straight-edged cutters are incapable of cutting curved outlines with absolute accuracy because necessarily the outlines thereby cut consist of straight segments and cannot conform exactly to curved lines. In cutting convex outlines the departure from the exact curvature is unimportant, but in cutting concave outlines corresponding to a model the departure is more serious because the corners of the cutter must unavoidably cut more deeply into the reproduced article than the required outline. That this must be so is evident from the fact that if the straight edge of the cutter is tangent to the required curve at any point in a concave or recessed part of the outline, one or both corners of the cutter must extend into the stock within the required curve. A further difficulty has been encountered in that it is difficult to feed the stock always with respect to the cutter head so that the line to be cut is always exactly tangent to the edge of the cutter, and frequently, particularly when cutting out sharply concave parts of the outline, this line becomes considerably inclined to the cutting edge at the cutting point. The result generally has been to cut an outline having notches as shown, in a somewhat exaggerated way, in Figure 4. This effect is particularly pronounced in hard stock, such as sheet iron and the like, and in such stock it is particularly objectionable. If the projections are removed by filing or other character of trimming to a depth great enough to make the notched edge smooth, the accuracy of the outline is destroyed to a greater or less extent, because it is thereby carried back to the bottoms of the notches, which lie within the correct bounding outline of the pattern.

With the improved form of cutting or shearing device no such error can occur, even when the line on which the pattern is cut is held at a considerable angle to the line tangent to the central point of the cutting edge. No matter how much the pattern is inclined out of the correct position, within limits, the cut made by the cutter is accurately placed and is always tangent to the correct bounding line of the article. The piece thereby cut is outlined as shown in Figure 5 by a series of scallops, all of which are tangent to the correct bounding line. The height of the ridges between the scallops is determined by the rate of feed of the stock past the cutting device and may, by making the feed slow enough, be reduced to inconsiderable trifles. In any event these projections or ridges can be removed by buffing, and when thus removed the resulting smooth edge conforms exactly to the correct finished outline required in the piece.

The cutting element or knife 10 is removable from the carrier 21 for sharpening and renewal, being contained in a socket 40 open at one end of the block. There are two such sockets arranged at respectively opposite ends of the block and opening into the transverse slot 27 thereof. The inner end of the blade rests on a stop 41, and is retained in place by a pin 42 which passes through the block and projects into a notch in the side of the knife. The pin 42 and stop 41 may both be removed when it becomes necessary to take out the knife, the knife being dislodged by an instrument inserted through the alined socket 40 in the opposite end of the block and pressed against the butt or foot of the knife.

What we claim and desire to secure by Letters Patent is:

1. A cutting apparatus comprising a movable cutter or blade having a curved cutting edge, the projection of which on the cutting plane is curved and a complemental cutter for holding the stock against the thrust of said cutting edge and at one side of the path thereof.

2. A cutting mechanism comprising complemental shearing cutters one of which has a straight edge and the other a curved edge, the projection of which on the cutting plane is a curve tangent to the projection on the same plane of said straight edge.

3. A cutting or shearing apparatus comprising complemental cutters one of which has a straight edge and the other has an edge, the projection of which on the cutting plane is a curved line.

4. A cutting or shearing apparatus comprising complemental cutters one of which has a straight edge and the other has an edge, the projection of which on the cutting plane is a curved line, and one of said elements being movable across the line of the edge of the other element substantially tangent thereto.

5. A cutting or shearing mechanism comprising a relatively stationary disk cutter having a cutting edge, a complemental cutter having a curved cutting edge and being movable across the cutting edge of the first cutter in a path which brings the central part of its edge substantially tangent to the edge of the first cutter.

In testimony whereof we have affixed our signatures.

JOHN ABBOTT,
ALFRED BENSON WHITE,
*Administrators of the estate of Albert F. Preston, deceased.*